(12) United States Patent
Baird et al.

(10) Patent No.: US 8,099,436 B2
(45) Date of Patent: Jan. 17, 2012

(54) METHODS AND SYSTEMS FOR AUTOMATED SEARCHING

(75) Inventors: Bruce R. Baird, Salt Lake City, UT (US); John M. Zollinger, Sugar Land, TX (US)

(73) Assignee: Lasimer NY LLC, Wilmington, DE (US)

( * ) Notice: Subject to any disclaimer, the term of this patent is extended or adjusted under 35 U.S.C. 154(b) by 0 days.

(21) Appl. No.: 12/862,607

(22) Filed: Aug. 24, 2010

(65) Prior Publication Data

US 2011/0047137 A1    Feb. 24, 2011

Related U.S. Application Data

(63) Continuation of application No. 11/925,646, filed on Oct. 26, 2007, now Pat. No. 7,797,301, which is a continuation of application No. 09/875,444, filed on Jun. 6, 2001, now Pat. No. 7,308,439.

(51) Int. Cl.
*G06F 17/30* (2006.01)

(52) U.S. Cl. ......... 707/791; 707/802; 707/822; 707/828

(58) Field of Classification Search .......... 707/600–831
See application file for complete search history.

(56) References Cited

U.S. PATENT DOCUMENTS

| | | | |
|---|---|---|---|
| 5,838,965 A * | 11/1998 | Kavanagh et al. .......... 1/1 |
| 5,873,107 A | 2/1999 | Borovoy |
| 5,930,791 A | 7/1999 | Leu |
| 5,950,194 A | 9/1999 | Bennett |
| 6,125,361 A | 9/2000 | Chakrabarti |
| 6,338,059 B1 | 1/2002 | Fields |
| 6,349,295 B1 | 2/2002 | Tedesco |
| 6,529,897 B1 | 3/2003 | Corl |
| 6,556,987 B1 | 4/2003 | Brown |
| 6,636,854 B2 | 10/2003 | Dutta |
| 6,701,473 B2 | 3/2004 | Braseth |
| 6,839,702 B1 | 1/2005 | Patel et al. |
| 6,862,710 B1 | 3/2005 | Marchisio |
| 6,865,710 B2 | 3/2005 | Bickerstaff |
| 2002/0073079 A1 | 6/2002 | Terheggen |

OTHER PUBLICATIONS

U.S. Appl. No. 09/875,444, Sep. 12, 2003, Office Action.
U.S. Appl. No. 09/875,444, Apr. 28, 2004, Office Action.
U.S. Appl. No. 09/875,444, Aug. 27, 2004, Office Action.
U.S. Appl. No. 09/875,444, Apr. 15, 2005, Office Action.
U.S. Appl. No. 09/875,444, Nov. 18, 2005, Office Action.
U.S. Appl. No. 09/875,444, Jul. 28, 2006, Office Action.
U.S. Appl. No. 09/875,444, Feb. 12, 2007, Notice of Allowance.
U.S. Appl. No. 09/875,444, Aug. 1, 2007, Notice of Allowance.
U.S. Appl. No. 11/925,646, May 13, 2010, Notice of Allowance.
U.S. Appl. No. 11/925,646, Nov. 24, 2009, Office Action.

* cited by examiner

*Primary Examiner* — Isaac M Woo
(74) *Attorney, Agent, or Firm* — Stolowitz Ford Cowger LLP

(57) ABSTRACT

The present invention provides systems and methods for automating a search over a network such as the Internet. A user selects data such as text from within an application. The selected data is activated and a search is performed without the user having to leave the application. The search is performed while the user is continuing within the application. When the search is complete, the search results are made available to the user within the application from which the search was initiated. In one embodiment, the data is pre-searched and the results are cached such that the results are already available should the user desire. The present invention is particularly suited to integration with an operating system such that the methods of the present invention are thereby available to all applications. Alternatively, the present invention can be specific to a particular application.

19 Claims, 2 Drawing Sheets

METHODS AND SYSTEMS FOR AUTOMATED SEARCHING

CROSS REFERENCE TO RELATED APPLICATIONS

This application is a continuation of U.S. patent application Ser. No. 11/925,646, filed Oct. 26, 2007 now U.S. Pat. No. 7,797,301, and entitled "METHODS AND SYSTEMS FOR AUTOMATED SEARCHING", which is a continuation of U.S. patent application Ser. No. 09/875,444, filed Jun. 6, 2001, entitled "METHODS AND SYSTEMS FOR USER ACTIVATED AUTOMATED SEARCHING", which is now issued as U.S. Pat. No. 7,308,439. The present application claims priority to the foregoing applications, which are incorporated herein by reference in their entireties.

BACKGROUND OF THE INVENTION

1. The Field of the Invention

The present invention relates to computer related searches and dynamic links. More specifically, the present invention relates to performing user defined searches and to creating user defined links from existing text.

2. Prior State of the Art

The primary problem addressed by this invention relates to how searches are currently performed on the Internet, an Intranet or other computer network. For example, when a user desires to perform a search while working within an application such as a word processor, the user must first exit the word processor and initiate a Internet browser. Once the Internet browser is opened, the user first opens a particular search engine or other database. Next, the user inputs the search terms into the selected search engine. The search engine then returns the search results to the user. Finally, the user must extract the information returned in the search result and input that information into the current application.

This can become a tedious and very unproductive process as the user spends time going between an application and a browser in order to perform various searches. In addition, the user often must perform the additional step of accessing the particular web site which may be returned in the search results. This additional step extends the process of searching the Internet for information or other data. What is needed are systems and methods for simplifying this process by allowing a user to search the Internet or other network from within an application more quickly and more easily.

SUMMARY

The present invention provides systems and methods for automating a search over a network such as the Internet. A user selects data such as text from within an application. The selected data is activated and a search is performed without the user having to leave the application. The search is performed while the user is continuing within the application. When the search is complete, the search results are made available to the user within the application from which the search was initiated. In one embodiment, the data is pre-searched and the results are cached such that the results are already available should the user desire. The present invention is particularly suited to integration with an operating system such that the methods of the present invention are thereby available to all applications. Alternatively, the present invention can be specific to a particular application.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
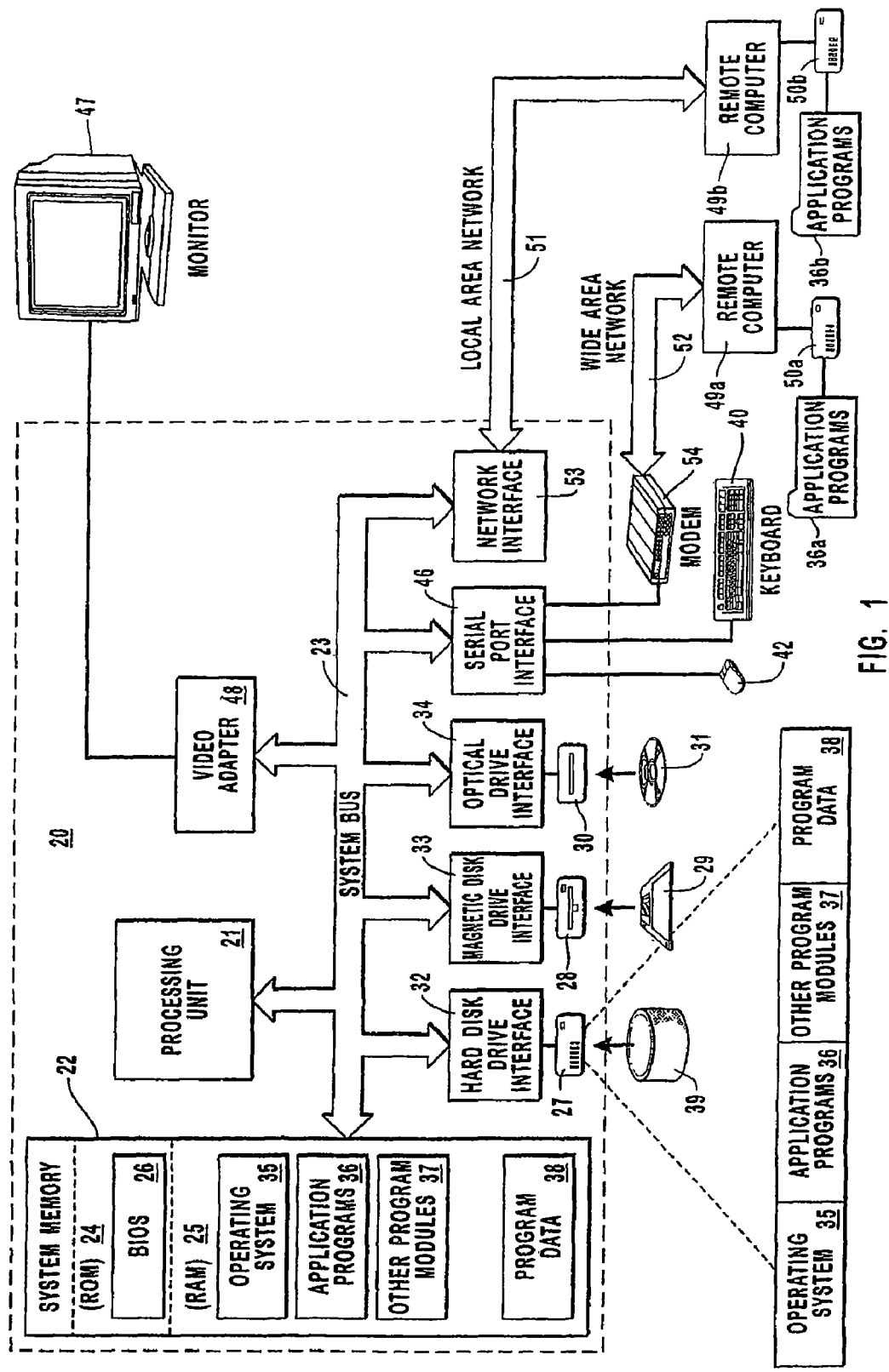
FIG. 1 illustrates an example system that provides an exemplary operating environment for the present invention.

One embodiment of the present invention relates to allowing a user to perform searches on the Internet without having to leave the particular application within which the user is operating. A preferred method is to allow the user to dynamically create a hyperlink or a link within the application. Once this link is created, the present invention provides for selecting search terms, executing the search request and returning the results to the user without the user having to leave the context of the application. For example, if the user is operating within a word processing program and desires to perform a search relating to some of the words within the document that is being created, the first step that the user must perform is to select the words or the text that correspond to the search terms. The creation of the link, in one embodiment, is an inherent part of the selection of text. In other embodiments, no link is created and the search terms are simply executed. The selection of this text can be done by methods currently known in the art such as highlighting the text with the mouse or keyboard commands.

Once the text has been selected, the user activates the selected text, which is an example of causing the search to be initiated. Frequently this can be done using a drop down menu, a right click of a mouse, a keyboard command, or a voice command or other method. A search is then performed based on the terms that have been selected. In one embodiment, after the text has been selected and activated, the search is performed in the background and the user may continue to operate within the application. Once the search has been performed, the search results are returned to the user. In some instances, those results can be input directly into the word processing application or other application, or the user has the option of previewing the results or viewing the results. The user can also store the results to a hard drive or other storage medium for later review. The present invention also has the ability to take into account the context of the document that is being created by the user. For example, the present invention may examine the sentence that contains the selected word to focus the search terms that have been selected.

While the present invention has been described herein with regards to word processing applications, the presentation may also be used in other situations. The present invention may be used to search documents that are saved or files that are saved in other locations. For instance, a user may designate one or more files that are stored on a network storage medium to serve as the search parameters. Alternatively, a user may initiate a search on a computer network for all files that contain particular words and then cause the present invention to search the Internet for information relating to those terms that have been identified by a user. The present invention may be used with text recognition applications, database applications, spreadsheet applications, and the like.

The user may designate which search engine or Internet site is to be used for the search. Alternatively, a user may designate that the search be performed on more than one search engine or that a metasearch engine be used. In other words, the present invention is highly configurable by the user. The user can specify which terms are to be searched. The user is also able to specify how the search is to be performed, whether it be a context based search or strictly limited to the terms or words that have been selected by the user. The user is able to indicate how the search is to be performed and where the search is to be performed. The user is also able to indicate how many results are to be returned. More simply, the user is able to configure, in a variety of ways, how the present invention is to be utilized. User preferences may be pre-set, but the present invention has the ability to learn a user's preferences.

The present invention also has a look-ahead feature. This look-ahead feature allows the present invention to search for terms that exist in a document, for example, and perform a search before the user actually indicates that a search is to be performed on those terms. For instance, when a brief is written, various cases are cited. When the present invention is able to detect a case citation, the search is automatically performed and the search results of that case citation may be provided through use of the present invention. This feature is particularly useful in a variety of situations including but not limited to: attorney's writing legal documents; doctors writing medical histories; accountants performing numerical analysis; journalists writing articles; and academicians researching projects.

The present invention is not limited, however, to searching for text. The present invention is capable of searching for image files, sound files, MPEG files, or other type of files that may exist and contain information that is accessible over the Internet or other networks. In one embodiment, these types of searches are performed using the metadata that accompanies these types of files. For example, graphic files typically have metadata that describes what the image is and these terms are able to be searched.

The present invention extends to both methods and systems for automating Internet searches. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
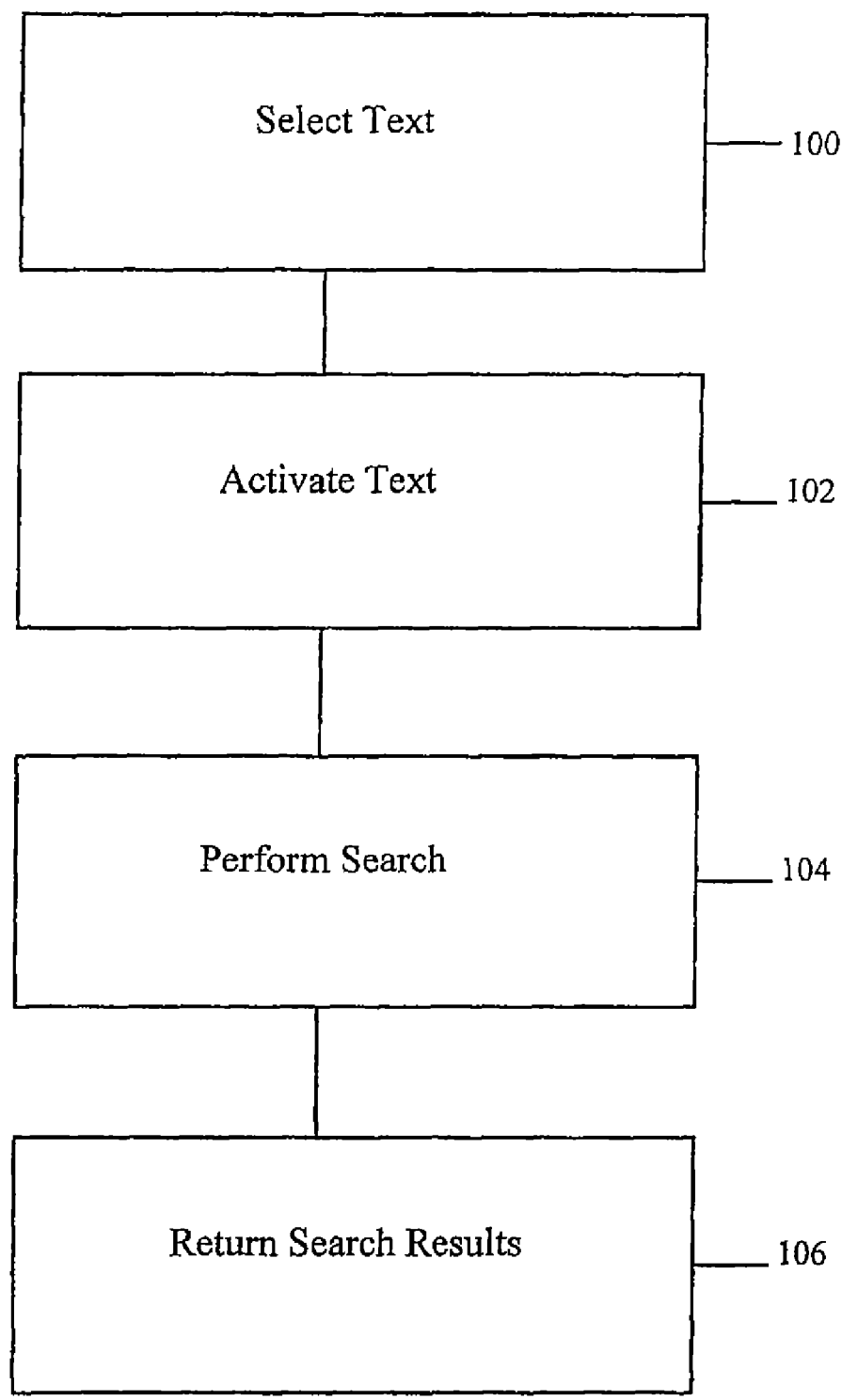
FIG. 2 is an exemplary flowchart illustrating a preferred method of the invention.

Referring to FIG. 2, which is an exemplary flowchart of a preferred embodiment of the present invention. In step 100 the user selects text which may be present in a document being created in a word processor. The methods and manners in which text may be selected include using a mouse or other device to select text. Text selection may be automatic, programmed or learned. The present invention is not limited to text however, but images or other data types may also be selected as described above. In step 102, the text or data is activated. Activating text or data refers to providing a drop down menu to a user to select the search engine or causing the computer to initiate the search without having the user select a search engine. Activating text or data also refers to creating or providing a link that may be activated or clicked on by the user. In one embodiment, the selection of text in step 100 and the activation of text in step 102 comprise creating a link in a user application or user document. In one embodiment, the created link contains the search terms selected by a user. When the link is clicked or activated, a search is performed using the terms in the link. The surrounding text or data may be used as context to focus the search in another embodiment.

In another embodiment of the present invention, it is understood that it is possible to perform the search based on the link that has been created and store the results for future access by a user. This enables the user to have instant access to the search results without having to perform the search again at a later date. The results of the search may be simply stored on the users local storage medium such as a local hard drive or RAM. In step 104, after the text has been selected and activated, the search is typically performed as indicated by the configuration settings or by the user. The search may be performed on an Internet search engine or over the Internet or through various other types of databases or networks, including but not limited to, intranets and extranets.

In step 106, the results of the search are returned to the user and can be displayed in a variety of manners. In other words, a user or the application is capable of manipulating the results. Manipulating the search results includes, but is not limited to, copying at least a portion of the search results, pasting at least a portion of the search results, deleting at least a portion the search results, saving at least a portion of the results, using the search results in accordance with pre-defined rules or procedures, and the like. For example, the results of the search may be displayed when the user mouses over the text that was previously selected. When that mouse crosses over the activated text the results can be displayed in a pop up window to a user and the user then has the ability to select which of the search results the user desires to place in the document or to read. In another embodiment, the present invention may simply place the first result of the search into the document without further user input. For example, if the search result is a court case citation, then the citation may be placed within the text. The user then has the ability to edit this result as if it were text that the user had created. These methods are intended to be exemplary descriptions of how search results can be returned to a user and used in a document or other application. Additionally, more than one portion of the text or other data may be activated. Also, linked and unlinked text and data displayed by a browser are included within preferred embodiments of the present invention.

Essentially, hyperlinks or links are being created where hyperlinks or links do not already exist. Links are dynamically created based on the data that is selected as well as the context of the selected data. For example, the search engine that is used to perform the search for a selected word (sentence, paragraph, image) may be determined based on the context of the word. If the word "aspirin" is selected in a sentence (page, etc.) that also has the word "interaction" in it, a medical drug interaction database may be searched instead of a generic search engine.

Basically, a user indicates what text is to be used in a search. This may be done in a number of ways depending on the application being executed by the user. In many instances, both the operating system and a particular application are involved in the selection of text or other data. Depending on the application, for example, a user may highlight the text (with mouse, keyboard, or some other way); hover the cursor over the text; and wherever the cursor is in some document (like while doing word processing).

Once the text to search for is indicated in some fashion, the user will trigger the search or activate the text. Again, this can happen in several ways, such as click the mouse (right, left, middle, etc.); key sequence (F12, etc.); menu item; main application menu; context menu (which usually comes up when the user right clicks in an application); toolbar button; voice command, dedicated keyboard or mouse button, and the like.

When the search action is initiated, the search may occur immediately based on the selected text and bring up the results in a web browser, or it may bring up a user interface to prompt the user for more information to fine tune the search actions being performed. For example, the user may: highlight a word; right click to bring up the context menu; or select the menu item. Once this action is performed, a dialog window is displayed asking the user if they want to search based on the word, the sentence the word is contained in, or the paragraph the word is contained in. The user will also be presented with a list of search engines they want to use to perform the search. The list of engines to use may come from a list the user configured ahead of time, a global list, or a list based on the selected terms. The search may be based on the context of the selected terms. For example, if the selected text or other data is a recognized medical term, then a list of medical related sites are displayed. If the search terms are the name of a car, then various car related web sites may be searched.

The search may be performed based on what other users with a similar profile to the current user may have used for similar terms in the past. For example, using the term "metal," a search for users in the manufacturing industry may be performed in a metallurgical database, while other a search for other users may be performed in a music database. The determination of which search engines will be displayed or used may be driven by the term and a user. Often a user ID may also be utilized in determining how the search is to be performed. One embodiment of the present invention is capable of determining how the search is to be performed while other embodiments leave the determination to other applications on the user's computer or on a remote computer.

Once the search engine(s) are determined or selected, the search is passed into the various search engines through their standard HTML or XTML form based method of searching. In addition, for search engines that may not be HTML or XTML based, other methods of triggering the search can be used. For example, searching for the term may occur in a company's glossary that resides in some database.

The results of the search can be displayed in the user's web browser, in an embedded browser window in the triggering application, or in some other custom interface that is used for displaying that search engine's results.

The present invention will interface with existing applications or operating systems via that application's API (application programming interface) to provide the user activated search functionality. A new set of context menu items may be added to each application. The fewer actions the user has to take to select the search term, and perform the search the better. This process depends on both the application and the application's application programming interfaces (APIs). One application may involve simply hovering the mouse point over a term and pressing the middle mouse button, other applications may involve highlighting the search terms and then right clicking to bring up a context menu such that the appropriate menu item may be selected.

Ideally, the present invention would be integrated with an operating system to provide this capability to every application on the system (similar to how most applications support cut/copy/paste). But, the present invention may also be application specific.

Some of the applications that obviously fit this functionality are web browsers, e-mail clients, word processors, spreadsheets, PDF viewers and the like, chat clients, voice recognition systems, operating systems and the like. Note that an operating system is also considered to be an application.

Searching the worldwide web need not be limited to HTML links pre-defined and embedded in web pages. Instead, any text can be immediately linked to a search engine or engines and, effectively, become a hypertext link through the present invention. The searchable text not only includes plain text in web pages but also encompasses text in any word processing program, spreadsheet, office suite or any other type of text.

The text to be searched can either be selected with a left double-click in most applications, or by dragging an inserted cursor (in HTML), or by shift/arrows in some programs. Depending on the language, structure, and API of the document containing the desired text, the text could be selected for searching by just hovering over the desired search terms.

For example, once the text is selected, a single right click brings up either a drop down menu listing search options or, depending upon the API for the underlying page, a detailed GUI. Either way, the options available for searching are configurable. For example, the default search could be on the word with a particular search engine over the entire web. Options could modify the default (e.g., search the entire sentence in context, search for graphic files, use a metasearch engine, search only news/information sites, search only an intra- or extranet) or allow complete customization on a per search basis.

The program is also intelligent in many ways. First, it can read the terms to be searched in the context of either the surrounding text or of the URL from whence it came. For example, if "cardinal" were selected as the text to be searched, the intelligence would provide different search results if the text were on a sports page than it would if the text came from a bird-watching page. A second type of intelligence will be learning the user's search preferences (e.g., shopping v. information v. entertainment, etc.). This intelligence can be both programmed in at the initial log-on and/or learned from repeated uses of the present invention.

A third type of intelligence would be a "look-ahead" feature. On a HTML page or in another application the program would identify non-hypertext terms likely to be searched (e.g., proper nouns or, depending on the users learned or entered preferences, terms of art in a particular field or fields), search the terms, and cache the results. The results of the search could be set to appear, for example as a pop-up when the cursor hovered over the text.

Specialized uses include a lawyer working on a brief typing a case, selecting the text and immediately being transported to a legal search engine such a Lexis or Westlaw. With the "look-ahead" feature operational and enabled the search results would already be resident and thus the search would be instantaneous. A doctor reviewing a patient report emailed by a colleague could instantly search medical journals and/or drug manufacturers for the latest information on a condition, procedure, or medication. On an intranet, a manager doing personnel evaluations could access all information about a particular employee without leaving the word-processing screen. An author writing or editing a story or book could search specialized databases for background information or details.

The present invention is not, as previously described, limited to text. The present invention can be used in conjunction with scanned data, text recognition devices and files, image files, MPEG files, voice commands and other user input and available data. The data may be selected, activated and searched. The user is relieved of leaving an application to externally and manually execute a search. The results of the search can be stored, incorporated into the specific application, viewed, pre-viewed or otherwise handled as specified by a user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method comprising:
   receiving specified data at a computing system, wherein the specified data comprises at least one or more word, number, character, image, sound or other data object, wherein the specified data is selectably received as one of the following:
      (a) user provided input which is provided as real-time data input from a user into the computing system through an input device comprising a mouse, a touch pad, a keyboard, a motion sensing device or another computing input device,
      (b) a user selection of data presented in one or more list or data presentation at the computing system with the selection being made from the input device, or
      (c) an automatic selection from accessible data which is made accessible to the computing system in response to user profile data or other user defined criteria;
   wherein the receipt of the specified data also includes excluding any data which has been identified through one or more user definable criteria as a term or data that should be excluded from the specified data;
   automatically converting the specified data into a search query;
   performing a search of the search query with one or more search engine against at least one of a resource local to the computing system, a local network, a remote network, the Internet, a remote database, or a database that is automatically or manually identified by user input or the user profile; and
   providing search results from the searching to the user at the computing system.

2. The method recited in claim 1, wherein the selection of the one or more search terms is performed automatically, without receiving any user input specifically identifying the one or more search terms.

3. The method recited in claim 1, wherein the selection of the one or more search terms is performed in response to a mouse prompt hovering over the one or more search terms.

4. The method recited in claim 3, wherein the user input comprises a selection of a displayed link.

5. The method recited in claim 4, wherein said manipulating includes copying at least a portion of the search results into the document.

6. The method recited in claim 1, wherein the method further includes saving the search results until user input is received requesting the search results, and wherein the user input requesting the search results is received after receiving the search results.

7. The method recited in claim 1, wherein the method further includes manipulating the search results with the first application.

8. The method as recited in claim 1, wherein the search of the one or more terms is performed in consideration of at least a context of the one or more search terms, as used in the document, by automatically selecting the at least one database by considering at least the context of the one or more search terms.

9. The method as recited in claim 1, wherein the search of the one or more terms is performed in consideration of at least a user profile of the user in determining how the search should be performed, by automatically selecting the at least one database by considering at least the user profile of the user.

10. The method as recited in claim 9, wherein the first application comprises at least one of a word processor or a spreadsheet application type.

11. The method as recited in claim 1, wherein the second application comprises a different application type than an application type of the first application.

12. The method as recited in claim 1, wherein the search is automatically performed in response to the second application receiving the one or more search terms from the first application.

13. The method recited in claim 12, wherein the preferences are predefined preferences.

14. The method recited in claim 12, wherein the rules specify whether a context of the one or more search terms in the document, including one or more other terms contained in the document, is to be considered in the search.

15. The method recited in claim 12, wherein the rules specify which of one or more types of search engines are to be used to perform the search.

16. The method recited in claim 12, wherein the rules specify which of one or more databases are to be searched based at least in part on a context of the one or more search terms in the document and a user profile of the user.

17. The method as recited in claim 1, wherein the second computing system considers preferences that define rules for performing the search and prior to performing the search.

18. A computer implemented method for automatically initiating a search of one or more terms from a document that is accessed by a first application at a first computing system and that is performed or controlled at least in part by a second application hosted by a second computing system, the computer implemented method comprising:
   receiving data reflective of a selection one or more search terms from a document that is accessed by a first application at a first computing system; and
   receiving, at the first application, search results that were obtained as a result of a search performed at least in part by a second application with the one or more search terms, and wherein the search is automatically performed in response to the first application identifying the one or more search terms and without requiring the user to initiate any display interface of the second application at the first computing system,
   wherein, subsequent to the selection of the one or more search terms, the second application, which is hosted by a second computing system receives data indicative of how a search corresponding to the one or more search terms is to be performed and without first requiring a user to launch the second application or discontinue use of the first application.

19. A computer implemented method for initiating a search of one or more terms from a document that is accessed by a first application at a first computing system and that is performed at least in part by a second application that is of a different type than the first application, the computer implemented method comprising:

receiving data reflective of a selection one or more search terms from a document that is accessed by a first application at a first computing system; and receiving, at the first application, search results that were obtained as a result of a search performed at least in part by a second application with the one or more search terms, and wherein the search is automatically performed in response to the first application identifying the one or more search terms and without requiring the user to initiate any display interface of the second application at the first computing system, wherein, subsequent to the selection of the one or more search terms, the second application, which is hosted by a second computing system receives data indicative of how a search corresponding to the one or more search terms is to be performed and without first requiring a user to launch the second application or discontinue use of the first application.

* * * * *